(12) United States Patent
Katzer

(10) Patent No.: US 7,673,302 B1
(45) Date of Patent: Mar. 2, 2010

(54) SYSTEM AND METHOD FOR MANAGING MESSAGES IN A QUEUING SYSTEM

(75) Inventor: Robin D. Katzer, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1588 days.

(21) Appl. No.: 10/927,454

(22) Filed: Aug. 26, 2004

(51) Int. Cl.
G06F 9/46 (2006.01)
G06F 3/00 (2006.01)

(52) U.S. Cl. .................... 718/101; 719/314; 710/39; 710/54

(58) Field of Classification Search ............ 718/101; 719/314; 710/39, 54
See application file for complete search history.

(56) References Cited

U.S. PATENT DOCUMENTS

| | | | | |
|---|---|---|---|---|
| 5,878,056 A | * | 3/1999 | Black et al. ............ | 714/748 |
| 5,925,098 A | * | 7/1999 | Freund et al. ........... | 709/203 |
| 7,509,653 B2 | * | 3/2009 | Das et al. .............. | 719/318 |
| 2003/0110230 A1 | * | 6/2003 | Holdsworth et al. ...... | 709/207 |
| 2004/0117801 A1 | * | 6/2004 | Eibach et al. .......... | 719/314 |

FOREIGN PATENT DOCUMENTS

KR 2002036050 A * 5/2002

* cited by examiner

Primary Examiner—Meng-Ai An
Assistant Examiner—Kenneth Tang

(57) ABSTRACT

A system for processing multiple potentially related requests is provided. The system includes a pending request queue, a related request queue, an in-process queue, and an adapter. The pending request queue receives requests from at least one application. The in-process queue receives a first request from the pending request queue when no other requests are present in the in-process queue related to the first request. The related request queue receives the first request from the pending request queue when other requests are present in the in-process queue related to the first request. The adapter monitors the pending request queue, related request queue, and in-process queue. The adapter also communicates information related to the requests from the pending request queue to the related request and in-process queues as appropriate. The adapter also communicates information related to the requests from the in-process queue to a processor for processing the requests.

20 Claims, 3 Drawing Sheets

SYSTEM AND METHOD FOR MANAGING MESSAGES IN A QUEUING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to processing multiple related computerized transactions. More particularly, embodiments of the present invention promote processing of dependent transactions in a proper order.

BACKGROUND OF THE INVENTION

An enterprise might need to process multiple transactions sent to the enterprise by one or more entities. For example, a retailer or service provider might need to fulfill orders or service requests sent by multiple customers or multiple orders or service requests sent by a single customer. In another example, a data management entity within an enterprise might receive requests from one or more other entities within the enterprise to perform updates to one or more databases. The word "request" will be used herein to refer to any such transaction. The entities sending requests to the enterprise can be considered customers regardless of whether they are outside companies sending requests to the enterprise, internal groups sending requests within the enterprise, or some other type of entity.

SUMMARY OF THE INVENTION

In one embodiment, a system for processing multiple potentially related requests is provided. The system includes a pending request queue, a related request queue, an in-process queue, and an adapter. The pending request queue receives requests and is pushed on to the bottom of the stack in the order as received from at least one application. The in-process queue receives a first request from the pending request queue when no other requests are present in the in-process queue related to the first request. The related request queue receives the first request from the pending request queue when other requests are present in the in-process queue related to the first request. The adapter monitors the pending request queue, related request queue, and in-process queue. The adapter also communicates information related to the requests from the pending request queue to the related request and in-process queues as appropriate. The adapter also communicates information related to the requests from the in-process queue to a processor for processing the requests.

An alternative embodiment is a method for processing a request including sending a first request to a pending request queue and comparing requests in the pending request queue to requests in an in-process queue. When the first request in the pending request queue is not related to at least one of the requests in the in-process queue, sending the first request to the in-process queue. When the first request in the pending request queue is related to at least one of the requests in the in-process queue, sending the first request to a related request queue. The method includes processing at least one of the requests in the in-process queue, and comparing requests in the related request queue to requests in the in-process queue. The method includes selecting one of the requests from the related request queue. When the selected request in the related request queue is not related to at least one of the requests in the in-process queue, sending to the in-process queue the selected request from the related request queue.

In yet another embodiment, a system for processing multiple potentially related requests is provided. The system includes a pending request queue operable to receive requests from at least one application. The system includes an in-process queue to receive at least a portion of a first request from the pending request queue when no other requests are present in the in-process queue or retry queue/cache related to the first request. A related request queue receives the at least portion of the first request from the pending request queue when other requests are present in the in-process queue related to the first request. The system includes a processor operable to process the requests, and a retry queue to receive at least a portion of requests returned upon error during processing by the processor. The system also includes an adapter to monitor the pending request queue, related request queue, and in-process queue and to communicate information related to the requests from the pending request queue to the related request and in-process queues as appropriate. The adapter communicates information related to the requests from the in-process queue to the processor for processing the requests.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

When two or more requests are related to the same customer, one request can have a dependency on another request. That is, a particular request might be processed successfully only if another particular request is successfully processed first. When multiple requests related to a single customer are sent to an enterprise, the enterprise does not always receive the requests in the sequence in which they should be processed. A request that is dependent on another request could arrive before the request that should precede it. Therefore, if the requests are processed in the order in which they are received, errors can occur. Also, if parallel processing is performed on multiple requests, it is possible that processing could be completed for a second request before processing is completed for a first request even if processing began for the first request before processing began for the second request. It is desirable that requests be processed in a proper sequence so that processing errors do not occur due to failure to properly observe dependencies.

Embodiments of the present invention promote processing of dependent and requests related to a single customer are processed in a proper order. A set of requests related to a single customer is processed in the order in which the requests are received. If an error occurs because a request is processed out of order, the request causing the error is sent to a repository where it can be held until the request that must precede it is processed successfully. The present system segregates request in multiple queues. Incoming requests are placed in the pending requests queue, and are checked against requests in the in-process queue prior to processing. Related request are placed in the related requests queue to allow the related request to process before processing the subsequent request. Requests that create errors are placed in the retry queue.

Figure 1:
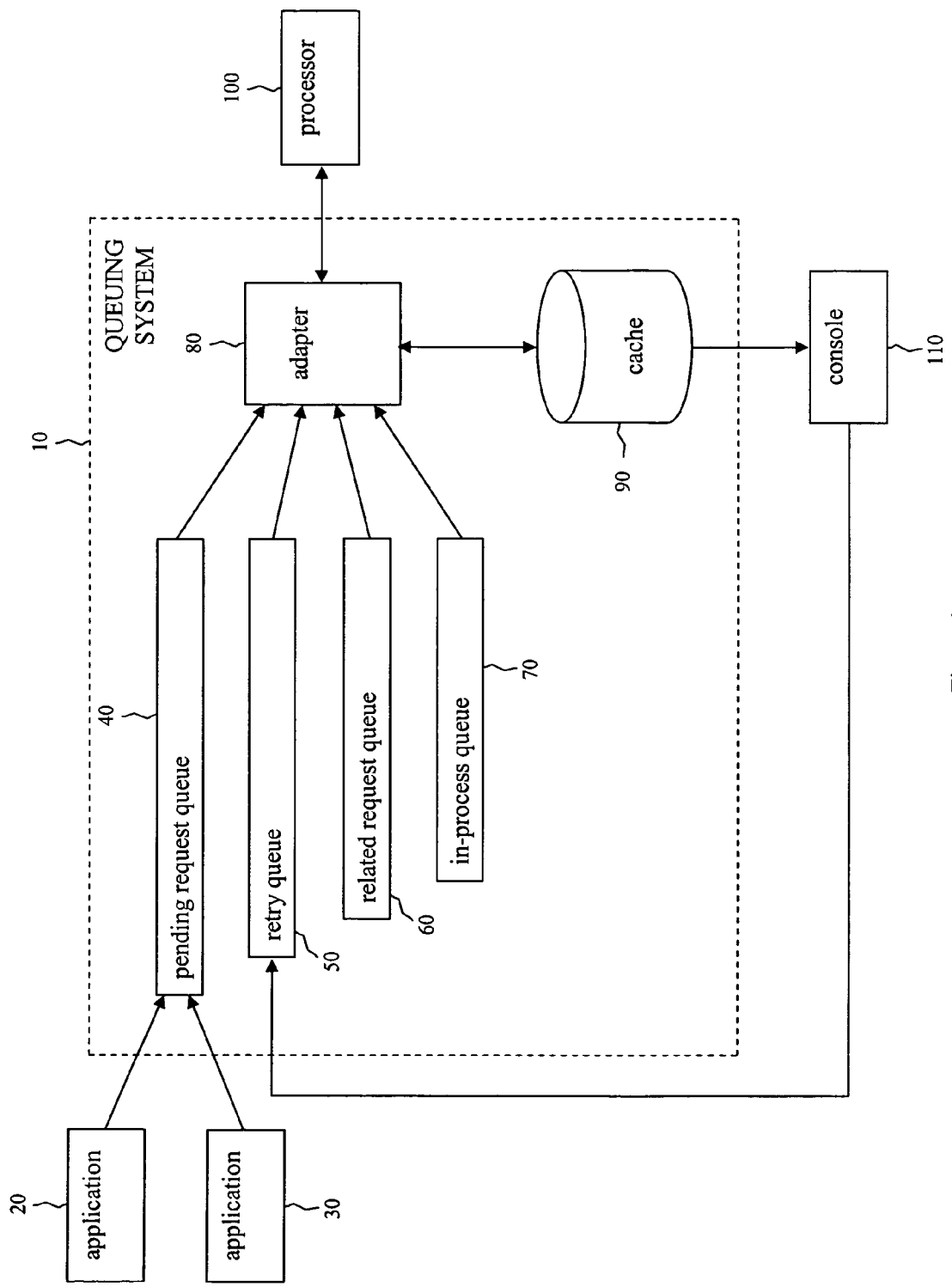
FIG. 1 is a block diagram of an embodiment of a queuing system for the processing of related requests.

An embodiment of a system in which requests can be processed in such a manner is shown in FIG. 1. Two computer applications 20 and 30 send requests to a queuing system 10. While two applications are shown, other numbers could be present. Customers or customer representatives can interface with the computer applications 20 and 30 to send requests to the queuing system 10. The queuing system 10 comprises a pending request queue 40, a retry queue 50, a related request queue 60, an in-process queue 70, an adapter 80, and a cache 90. Requests are sent by the queuing system 10 to a processor 100 where they can be processed in the manner requested by the customers or customer representatives via applications 20 and/or 30.

One or more applications 20 and/or 30 can send multiple related requests to the queuing system 10. As used herein, the terms "related to", "related request", and the like typically refer to requests pertaining to the same customer. However, it should be understood that requests can be related to each other in ways other than by pertaining to a single customer. Any requests with a common attribute that might require that the processing of one request be taken into consideration when the other request is being processed can be considered related to each other.

A set of related requests might need to be processed in a particular order and errors could occur if that order is not maintained. For various reasons, a set of related requests might arrive from the applications 20 and/or 30 at the queuing system 10 in an order different from that in which they should be processed. The queuing system 10 is operable to return the requests to a correct order and/or allow them to be processed in the proper order or at least to be processed successfully.

Requests submitted by the applications 20 and/or 30 are sent to the pending request queue 40. The adapter 80 determines whether a request in the pending request queue 40 is related to a request in the related request queue 60, the in-process queue 70, or the retry queue 50. If a request in the pending request queue 40 is not related to a request in the related request queue 60, the in-process queue 70, or the retry queue 50, the request is sent to the in-process queue 70.

The in-process queue 70 can contain actual requests that it passes on to the adapter 80 and then to the processor 100 when it is appropriate to do so. Alternatively, requests ready to be processed might be sent directly to the adapter 80 and processor 100 without actually passing through the in-process queue 70. The in-process queue 70 would then act, for example, as a list that keeps track of the requests being processed by the processor 100.

As used herein, terms such as "send to the in-process queue", "update the in-process queue", and the like can refer to the sending of a request to the in-process queue 70 and thence to the adapter 80 or can refer to the sending of a request to the adapter 80 and the updating of the in-process queue 70 to reflect that the request is in process. In either case, when the adapter 80 sends a request to the processor 100 and the processor 100 completes the request, either successfully or unsuccessfully, the in-process queue 70 is updated to reflect that that request is no longer in process.

If a request in the pending request queue 40 is related to a request in the in-process queue 70, the request is sent from the pending request queue 40 to the related request queue 60. The related request queue 60 holds requests until related requests in the in-process queue 70 are completed, either successfully or unsuccessfully. When related requests in the in-process queue 70 are complete, a request can move from the related request queue 60 to the in-process queue 70. In one embodiment, the queuing system 10 is operable to monitor the time of a request, such as the time the request is received in the queuing system 10, a time the request is generated or sent from the requestor, or other time related stamp or component related to the request. The queuing system 10 may use this time element to order or arrange the requests to promote processing of dependent requests in the appropriate order to prevent errors or exceptions.

If a request enters the queuing system 10 out of order and is sent to the processor 100 before another request on which the first request depends is successfully completed, an error might occur. Typically if an error occurs, it may have been caused due to bad data or by a back-office system being down. Request typically will not be out of order since the queue maintains request in the order received. In that case, the processor 100 will send the request back to the adapter 80, which then sends the request to the retry queue 50. In an embodiment, the actual request is sent to the retry queue 50. Alternatively, the request is sent to the cache 90 and the cache 90 informs a console 110 of the error. The retry queue 50 is then updated from the console 110 to reflect that an exception request has been processed. In this case, the retry queue 50 acts as a list that keeps track of the requests for which errors have occurred. As used herein, terms such as "send to the retry queue", "update the retry queue", and the like can refer to the sending of a request to the retry queue 50 or to the sending of a request to the cache 90 and the updating of the retry queue 50 to reflect that a request needs to be retried.

A request in the retry queue 50 can be referred to as a failed request. A failed request will remain in the retry queue 50 until a request related to it is processed. An attempt can then be made to process the failed request. If the related request was the request on which the failed request was dependent, then the failed request might process successfully. If the related request was not the request on which the failed request was dependent, then the failed request will fail again and will be sent back to the retry queue 50. This process can continue until the failed request is processed successfully.

The adapter 80 acts as a monitor and controller for the queues 40, 50, 60, and 70. The adapter 80 examines the requests in the various queues 40, 50, 60, and 70, determines how to handle each request based on the presence or absence of related requests in the other queues 40, 50, 60, and 70, and then, based on this determination, either leaves the request where it is or sends the request to the related request queue 60 or the in-process queue 70.

For requests that are in the pending request queue 40, the adapter 80 sends the requests to either the related request queue 60 or the in-process queue 70. If a request in the pending request queue 40 is related to a request in the related request queue 60 or the in-process queue 70, the request in the pending request queue 40 is sent to the related request queue 60. If a request in the pending request queue 40 is not related to a request in the related request queue 60 or the in-process queue 70, the request in the pending request queue 40 is sent to the in-process queue 70.

For requests that are in the related request queue 60, the adapter 80 either leaves the requests in the related request queue 60 or sends the requests to the in-process queue 70. If a request in the related request queue 60 is related to a request in the in-process queue 70, the request remains in the related request queue 60. If a request in the related request queue 60 is not related to a request in the in-process queue 70, the request in the related request queue 60 is sent to the in-process queue 70.

The adapter 80 typically allows requests that are in the retry queue 50 to remain in the retry queue 50 until a related request has been processed. The fact that a request is in the retry queue 50 suggests that it failed because it was processed before another request that should have been processed first. Until the prerequisite request completes successfully, a request in the retry queue 50 typically cannot complete successfully. However, it may not be possible to determine prior to the processing of a related request whether the related request is the prerequisite for a request that is in the retry queue 50.

When a related request is processed successfully, the request in the retry queue 50 can be sent to either the in-process queue 70 or the related request queue 60 for processing. If the request that was in the retry queue 50 processes successfully, it can be assumed that the related request was the prerequisite. If the request that was in the retry queue 50 does not process successfully, it can be assumed that the related request was not the prerequisite and the request that was in the retry queue 50 is returned to the retry queue 50 to await the processing of another related request.

There are several ways in which the adapter 80 can examine the requests in the pending request queue 40, the retry queue 50, the related request queue 60, and the in-process queue 70 and determine how the requests should be managed. For example, the adapter 80 might periodically examine the requests in the pending request queue 40, the retry queue 50, the related request queue 60, and the in-process queue 70. Using logic similar to that described above, the adapter 80 might then determine whether any of the requests can be moved to another queue.

Alternatively, rather than checking on a periodic basis, the adapter 80 can check the pending request queue 40, the retry queue 50, and the related request queue 60 only when a request is processed by the processor 100 and that request is removed from the in-process queue 70. The adapter 80 can then determine if any requests in the queues 40, 50, or 60 are related to the request that just completed. If such a request is found, it can be moved appropriately based on logic similar to that described above. Other ways in which the adapter 80 can examine the queues 40, 50, 60, and 70, and move requests among the queues 40, 50, 60, and 70 will be apparent to one of skill in the art.

When an error occurs in the processor 100 because a request exception has occurred, the request can be stored in the cache 90 and the retry queue 50 can be updated to reflect that the request needs to be retried. The cache 90 can send a notice of the error to a request management console 110. The request management console 110 might be an automated error processing system, a graphical user interface that displays error messages, or other systems for handling errors. In the case of an automated system, the console 110 might simply cause the request that caused the error to be listed in the retry queue 50. In the case of a graphical user interface, a human operator might observe that an error has occurred and might perform some manual error correction procedures before using the console 110 to list the request in the retry queue 50.

The cache 90 or some other data storage medium can hold copies of the information present in the various queues 40, 50, 60, and 70. If an error occurs that causes the information in a queue 40, 50, 60, or 70 to be lost, the information can be retrieved from the cache 90 or other medium and returned to the appropriate queue.

An enterprise might wish to perform parallel processing to increase the efficiency of the handling of the requests. That is, multiple requests may be processed by the adapter 80 and then by the processor 100 in a multi-threaded manner. The requests from the applications 20 and/or 30 may enter the pending request queue 40 in a serial or parallel fashion. Multiple requests for a single customer can be assumed to enter in the order in which they should be processed. The adapter 80 might pull the requests from the pending request queue 40 in a parallel fashion and then, after checking the other queues 50, 60, and 70, send the requests to the processor 100 for approximately simultaneous processing. Processing of requests in the other queues 50, 60, and 70 could also be done in a parallel manner.

While parallel processing can increase the overall processing speed, it could cause multiple requests for a single customer to lose their proper sequence. Due to parallel processing, it is possible that a second request to enter the pending request queue 40 could complete processing before a first request to enter the pending request queue 40. Completion of the second request before the first request could, for example, cause an error.

The use of the related request queue 60 can alleviate this problem. For example, a first request for a particular customer might be a prerequisite for a second request for that customer. Without the related request queue 60, parallel processing could allow the second request to begin processing while processing of the first request is still in progress. It might then be possible for the second request to complete its processing before the first request is complete, causing an error.

With the related request queue 60 present, if the first request reaches the pending request queue 40 before the second request, the first request will typically be sent by the adapter 80 to the processor 100 and the second request will be sent to the related request queue 60. Holding the second request in the related request queue 60 allows the first request to complete its processing before the second request begins its processing, thus ensuring that the second request cannot be completed before its prerequisite. The in-process queue 70 can be updated to reflect that the first request is complete and the second request can then be moved from the related request queue 60 to the adapter 80 and the processor 100 for processing.

If a sequencing error occurred due to parallel processing or for some other reason, the second request could actually begin processing first and the first request could be sent to the related request queue 60. In that case, the second request is likely to fail and be sent to the retry queue 50. The first request may then be moved from the related request queue 60 and processed. Upon its completion, the second request would then be retried.

Figure 2:
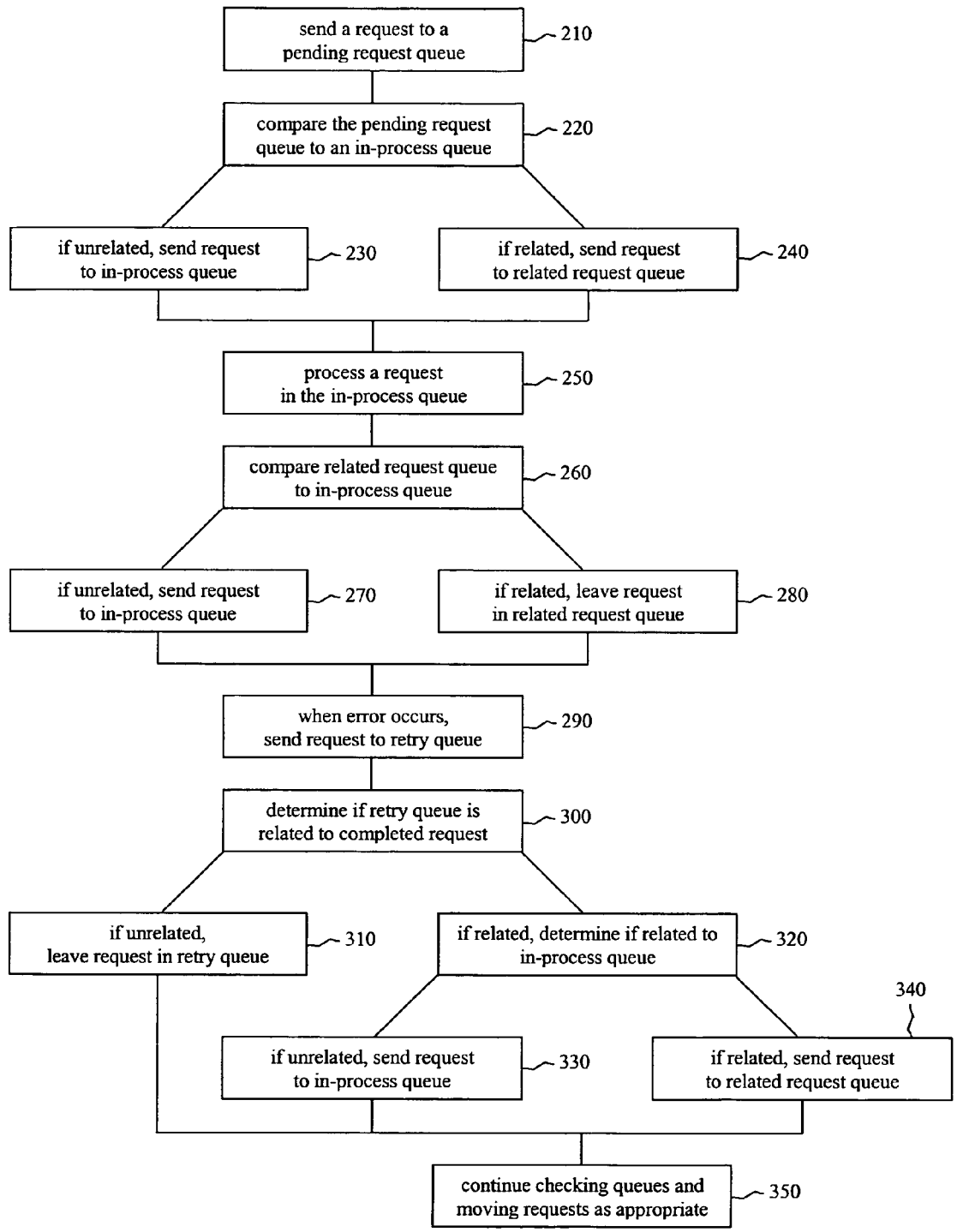
FIG. 2 is a flowchart of a method for ensuring that requests are processed in a proper order.

FIG. 2 illustrates an embodiment of a method for ensuring that requests are processed in a proper order. In box 210, a request is sent to a pending request queue. In box 220, a request in the pending request queue is compared to the requests in an in-process queue. In box 230, if a request in the pending request queue is not related to a request in the in-process queue, the unrelated request is sent to the in-process queue. In box 240, if a request in the pending request queue is related to a request in the in-process queue, the related request is sent to a related request queue.

A request that is in the in-process queue is processed in box 250. The processing might consist of sending the request from the in-process queue to an adapter and from the adapter to a processor. Alternatively, the processing might consist of sending the request to an adapter and from the adapter to a processor and updating the in-process queue to reflect that the request is being processed.

In box 260, a request in the related request queue is compared to the requests in an in-process queue. In box 270, if a request in the related request queue is not related to a request in the in-process queue, the unrelated request is sent to the in-process queue. In box 280, if a request in the related request queue is related to a request in the in-process queue, the related request is left in the related request queue.

If an error occurs in the processing of a request, the request is sent to a retry queue in box 290. In box 300, a determination is made whether a request in the retry queue is related to a request that has completed processing. In box 310, if a request in the retry queue is not related to a request that has completed processing, the request in the retry queue is left in the retry queue. In box 320, if a request in the retry queue is related to a request that has completed processing, the request in the retry queue is compared to the requests in the in-process queue. In box 330, if the request in the retry queue is not related to a request in the in-process queue, the request in the retry queue is sent to the in-process queue. In box 340, if the request in the retry queue is related to a request in the in-process queue, the request in the retry queue is sent to the related request queue.

In box 350, the procedure of processing requests, checking queues, comparing the requests in the queues, and moving the requests among the queues as appropriate continues for other requests.

The above steps do not necessarily need to take place in the sequence described. For example, the comparison of requests in the retry queue with recently completed requests could occur on a periodic basis or could occur only when a request is successfully processed. Also, the processing could occur in a parallel manner wherein steps that are described above as sequential actually take place approximately simultaneously. One of skill in the art will recognize that other sequences can achieve similar results.

Figure 3:
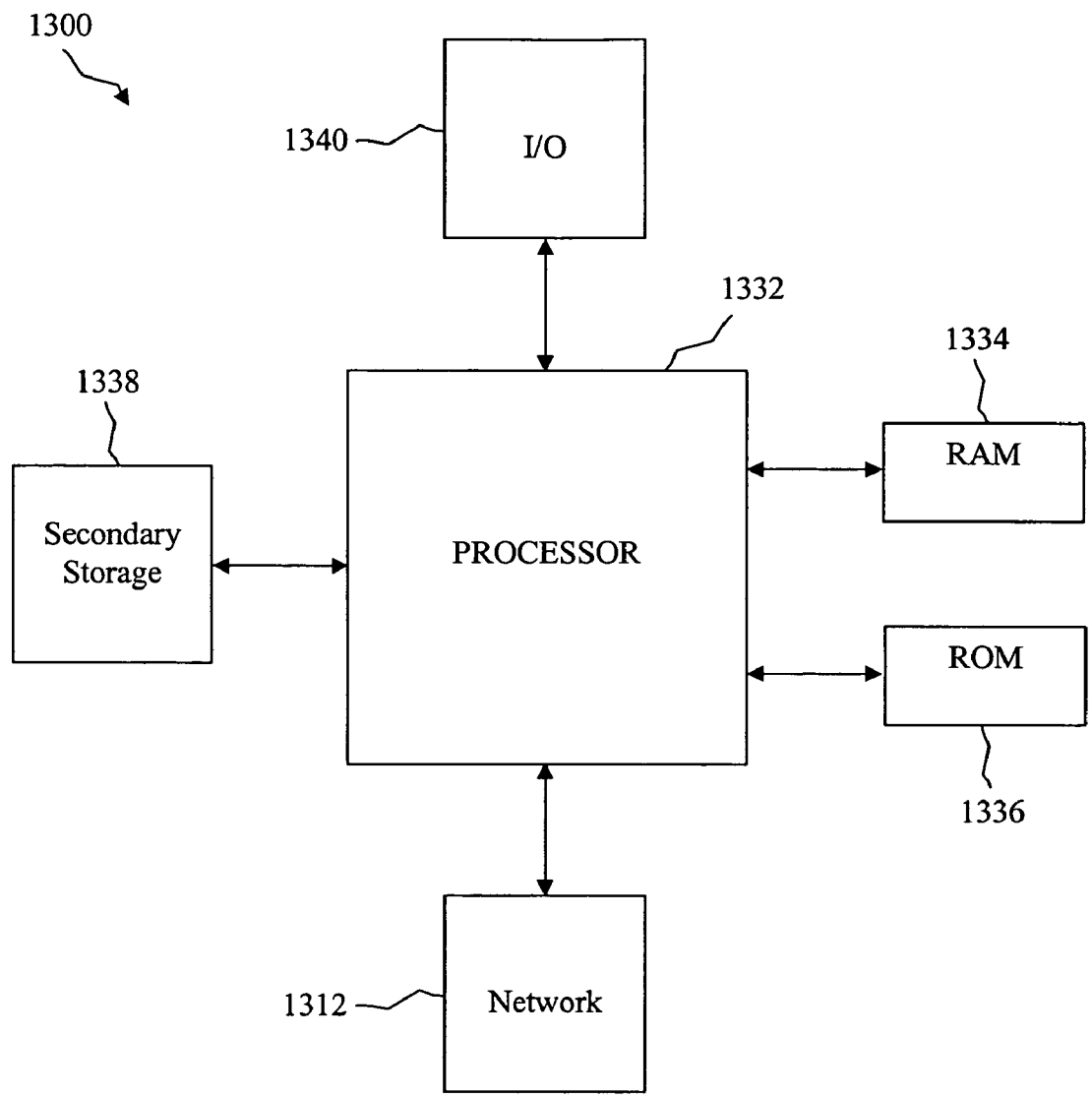
FIG. 3 is a block diagram of a computing system.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) 1340 devices, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O 1340 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1312 may take the form of modems, modem banks, ethernet cards, universal serial bus (USB) interface cards, serial interfaces, token ring cards, fiber distributed data interface (DDI) cards, wireless local area network (WLAN) cards, radio transceiver cards such as Global System for Mobile Communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from the network, or might output information to the network in the course of performing the above-described method steps. Such information, which is often represented as a sequence of instructions to be executed using processor 1332, may be received from and outputted to the network, for example, in the form of a computer data signal embodied in a carrier wave.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312.

While several embodiments have been provided in the present disclosure, it should be understood that the Parallel FIFO Queue Adapter may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for processing multiple potentially related requests comprising:
   a pending request queue stored on a computer readable storage medium that receives requests from at least one application;
   an in-process queue stored on a computer readable storage medium that receives a first request from the pending request queue when no other requests are present in the in-process queue related to the first request;
   a related request queue stored on a computer readable storage medium that receives a second request from the pending request queue when the second request is related to the first request present in the in-process queue;
   a retry queue stored on a computer readable storage medium that receives the first request when an error occurs during processing the first request from the in-process queue and further maintains the first request until the second request is processed directly or indirectly from the related request queue, wherein when the retry queue receives the first request, the first request is processed directly or indirectly from the retry queue; and
   an adapter stored on a computer readable storage medium that monitors the pending request queue, related request queue, retry queue, and in-process queue and to communicates information related to the requests from the pending request queue to the related request and in-process queues, the adapter further communicates information related to the requests from the in-process queue to a processor for processing the requests from the in process queue.

2. The system of claim 1 wherein the adapter is programmed to communicate information related to the requests from the pending request queue in a parallel manner.

3. The system of claim 1 wherein the adapter is programmed to communicate information related to the requests from the in-process queue in a parallel manner.

4. The system of claim 1 wherein the adapter moves the requests from the in-process queue in a parallel manner.

5. The system of claim 1 further comprising a data storage medium that stores information related to requests for retrieval.

6. The system of claim 1, wherein indirectly processing the second request from the related request queue comprises sending the second request to the in-process queue and processing the second request from the in-process queue.

7. The system of claim 1, wherein indirectly processing the first request from the retry queue comprises sending the first request to the in-process queue and processing the first request from the in-process queue.

8. A system for processing multiple potentially related requests comprising:
   a pending request queue that receives requests from at least one application;
   an in-process queue that receives a first request from the pending request queue when no other requests are present in the in-process queue related to the first request;
   a related request queue that receives a second request from the pending request queue when the second request is related to the first request present in the in-process queue;
   a processor that processes the first request from the in-process queue;
   a retry queue that receives the first request when the first request is returned upon error during processing by the processor and further maintains the first request until the second request is processed directly or indirectly from the related request queue, wherein when the retry queue receives the first request, the first request is processed directly or indirectly from the retry queue; and
   an adapter that monitors the pending request queue, related request queue, retry queue, and in-process queue and communicates information related to the requests from the pending request queue to the related request and in-process queues, the adapter further communicates information related to requests from the in-process queue to the processor for processing the requests from the in-process queue.

9. The system of claim 8, wherein the adapter processes information related to requests in parallel from the pending request queue, related request queue, and in-process queue.

10. The system of claim 8, further comprising a storage medium that stores requests returned on error during processing by the processor.

11. The system of claim 8, further comprising a console for arbitrating requests returned on error during processing by the processor.

12. The system of claim 11, further comprising a graphical user interface that identifies the requests returned on error during processing by the processor, and enables a user to manage any requests in error.

13. The system of claim 8, wherein indirectly processing the second request from the related request queue comprises sending the second request to the in-process queue and processing the second request from the in-process queue.

14. The system of claim 8, wherein indirectly processing the first request from the retry queue comprises sending the first request to the in-process queue and processing the first request from the in-process queue.

15. The system of claim 8, wherein indirectly processing the first request from the retry queue comprises sending the first request to the related request queue when there is a third request related to the first request in the in-process queue and processing the first request from the related request queue after the third request is processed.

16. The system of claim 8, wherein indirectly processing the first request from the retry queue comprises sending the first request to the related request queue when there is a third request related to the first request in the in-process queue, sending the first request to the in-process queue after the third request is processed, and processing the first request from the in-process queue.

17. A method for processing multiple potentially related requests comprising:
- receiving requests from at least one application at a pending request queue stored on a computer readable storage medium;
- comparing a first request in the pending request queue to requests in an in-process queue stored on a computer readable storage medium;
- sending the first request from the pending request queue to the in-process queue when the first request is not related to at least one of the requests in the in-process queue;
- comparing a second request in the pending request queue to the first request in the in-process queue;
- sending the second request from the pending request queue to a related request queue stored on a computer readable storage medium when the second request is related to the first request in the in-process queue;
- sending the first request from the in-process queue to a retry queue stored on a computer readable storage medium when an error occurs during processing of the first request from the in-process queue;
- maintaining the first request in the retry queue until the second request is directly or indirectly processed from the related request queue;
- processing the first request directly or indirectly from the retry queue; and
- monitoring, by an adapter stored on a computer readable storage medium, the pending request queue, related request queue, retry queue, and in-process queue and communicating, by the adapter, information related to requests from the pending request queue to the related request and in-process queues.

18. The method of claim 17, wherein indirectly processing the second request from the related request queue comprises sending the second request to the in-process queue and processing the second request from the in-process queue.

19. The method of claim 17 further comprising:
- processing the first request directly or indirectly from the retry queue when the first request is maintained by the retry queue.

20. The method of claim 17 further comprising storing in a data storage medium information related to requests, and when requests are lost, retrieving the information related to the lost requests from the storage medium.

* * * * *